(12) United States Patent
Turntine

(10) Patent No.: US 11,215,958 B1
(45) Date of Patent: Jan. 4, 2022

(54) AUTOMATED SYSTEMS FOR RECREATIONAL VEHICLE PARKING FACILITY

(71) Applicant: James Dean Turntine, Sullivan, MO (US)

(72) Inventor: James Dean Turntine, Sullivan, MO (US)

( * ) Notice: Subject to any disclaimer, the term of this patent is extended or adjusted under 35 U.S.C. 154(b) by 0 days.

(21) Appl. No.: 17/245,266

(22) Filed: Apr. 30, 2021

Related U.S. Application Data

(60) Provisional application No. 63/018,441, filed on Apr. 30, 2020.

(51) Int. Cl.
*G05B 19/042* (2006.01)
*G08G 1/14* (2006.01)
*G06Q 10/02* (2012.01)

(52) U.S. Cl.
CPC .......... *G05B 19/042* (2013.01); *G06Q 10/02* (2013.01); *G08G 1/146* (2013.01); *G08G 1/149* (2013.01); *G05B 2219/2639* (2013.01)

(58) Field of Classification Search
CPC ..................................................... G06Q 10/02
USPC ........................................................ 700/295
See application file for complete search history.

(56) References Cited

U.S. PATENT DOCUMENTS

| | | | |
|---|---|---|---|
| 4,519,657 A | 5/1985 | Jensen | |
| 5,432,508 A | 7/1995 | Jackson | |
| 5,451,755 A | 9/1995 | Duval et al. | |
| 6,002,340 A | 12/1999 | Smith | |
| 6,510,608 B1 * | 1/2003 | Marshall | B60P 3/36 29/401.1 |
| 6,844,716 B1 | 1/2005 | Lundberg et al. | |
| 6,850,898 B1 | 2/2005 | Murakami et al. | |
| 7,181,426 B2 | 2/2007 | Dutta | |
| 7,252,227 B2 | 8/2007 | Chase | |
| 7,818,190 B1 | 10/2010 | Sutherland | |
| 8,381,751 B2 | 2/2013 | Bartolotta | |

(Continued)

OTHER PUBLICATIONS

Russ and Tina De Maris Dump Station Etiquette [online]. RV Life, Jul. 6, 2017. Retrieved from the Internet: <URL: https://rvlife.com/dump-station-etiquette/>.

(Continued)

*Primary Examiner* — Md Azad
(74) *Attorney, Agent, or Firm* — Creativenture Law, LLC; Dennis J M Donahue, III; Kevin Staed

(57) ABSTRACT

The automated system provides automated and remote monitoring, control, communication, and management of recreational vehicle parking facilities, providing guests access to electric, water and sewer services via onsite hookup pedestals. Following the guest's reservation, payment and arrival at the correct parking site which is verified by sensors monitoring the sites, the system activates one or more hookup pedestals via smart switches and smart valves on separate power circuits from the sensors. A PLC operates with a smart switch to close the switch and deliver electrical power and also operates with the smart valve's actuator to an open flow state and a, and the electrical power activates a manual switch that disengages a cover latch which provides access to the dump station inlet. When a reservation window ends or the site is vacated, the system deactivates the hookup pedestals to end access to the utility services while the sensors remain active.

20 Claims, 7 Drawing Sheets

(56) References Cited

U.S. PATENT DOCUMENTS

| | | | |
|---|---|---|---|
| 8,624,428 | B2 | 1/2014 | Hurst et al. |
| 9,010,358 | B2 | 4/2015 | Bartolotta |
| 9,048,636 | B2 | 6/2015 | Borden et al. |
| 9,057,453 | B2 | 6/2015 | Pitchford et al. |
| 9,779,365 | B2 * | 10/2017 | Smullin ................ G06Q 10/02 |
| 10,476,253 | B2 | 11/2019 | Easton et al. |
| 2003/0004792 | A1 | 1/2003 | Townzen et al. |
| 2004/0236615 | A1 | 11/2004 | Msndy |
| 2005/0098627 | A1 * | 5/2005 | Chase ................... G06Q 10/02 |
| | | | 235/382 |
| 2007/0045411 | A1 | 3/2007 | Honingford et al. |
| 2008/0304212 | A1 | 12/2008 | Seff et al. |
| 2012/0127308 | A1 * | 5/2012 | Eldershaw ......... G08B 13/1672 |
| | | | 348/143 |
| 2012/0145719 | A1 * | 6/2012 | Bartolotta .............. E03F 11/00 |
| | | | 220/567.1 |
| 2014/0088780 | A1 * | 3/2014 | Chen ........................ G05F 1/66 |
| | | | 700/295 |
| 2019/0351783 | A1 * | 11/2019 | Goei ................. G05B 13/0265 |

OTHER PUBLICATIONS

US Military Campgrounds and RV Parks [online]. Military Camp Grounds, Apr. 19, 2020. Retrieved from the Internet: <URL:https://www.militarycampgrounds.us/massachusetts/uscg-cape-cod-mwr- . . . 1>.

STL RV Park [online]. StLouis RV Park, Mar. 30, 2020. Retrieved from the Internet: <URL:https://stlouisrvpark.com/accommodations/>.

\* cited by examiner

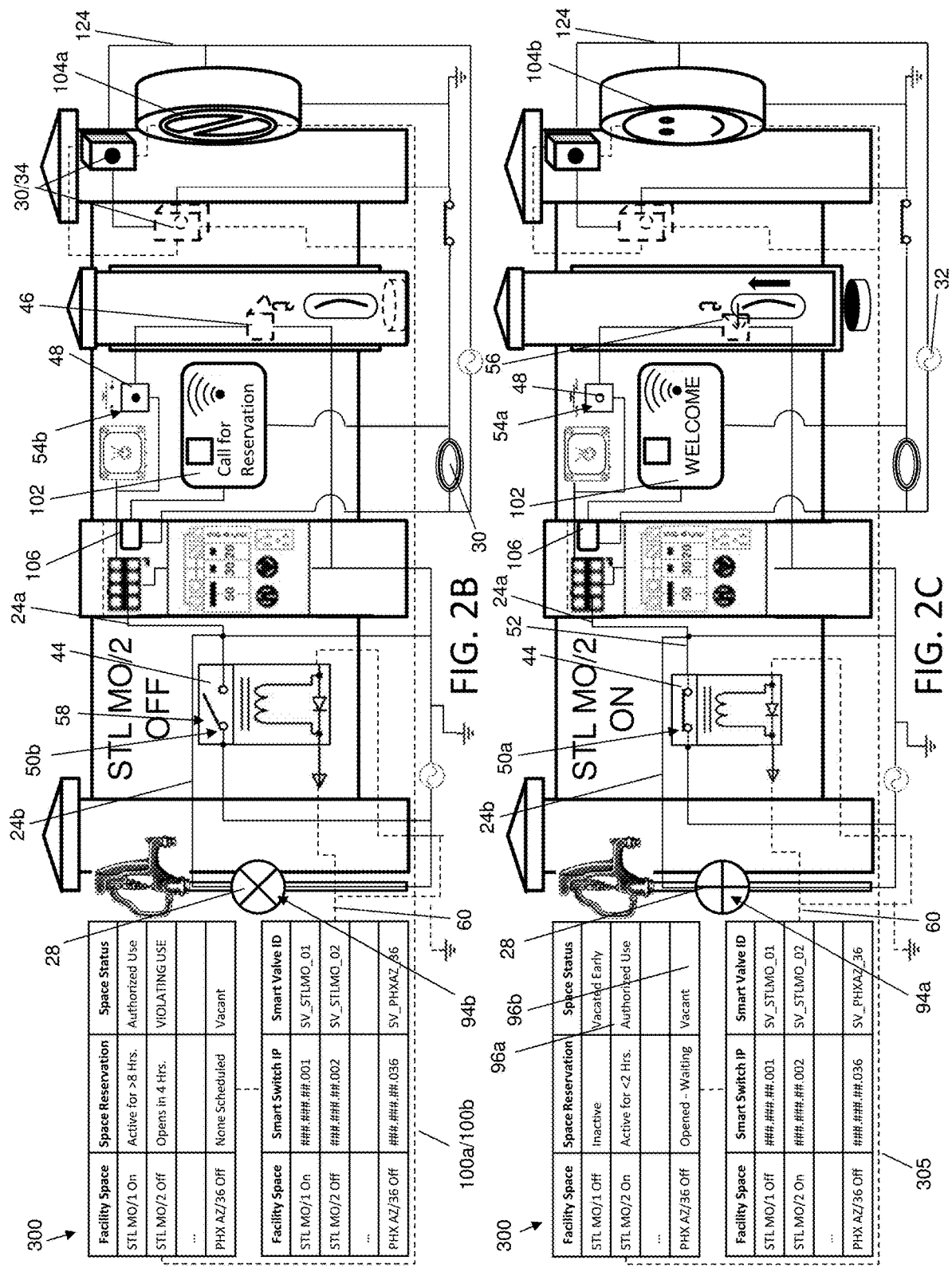

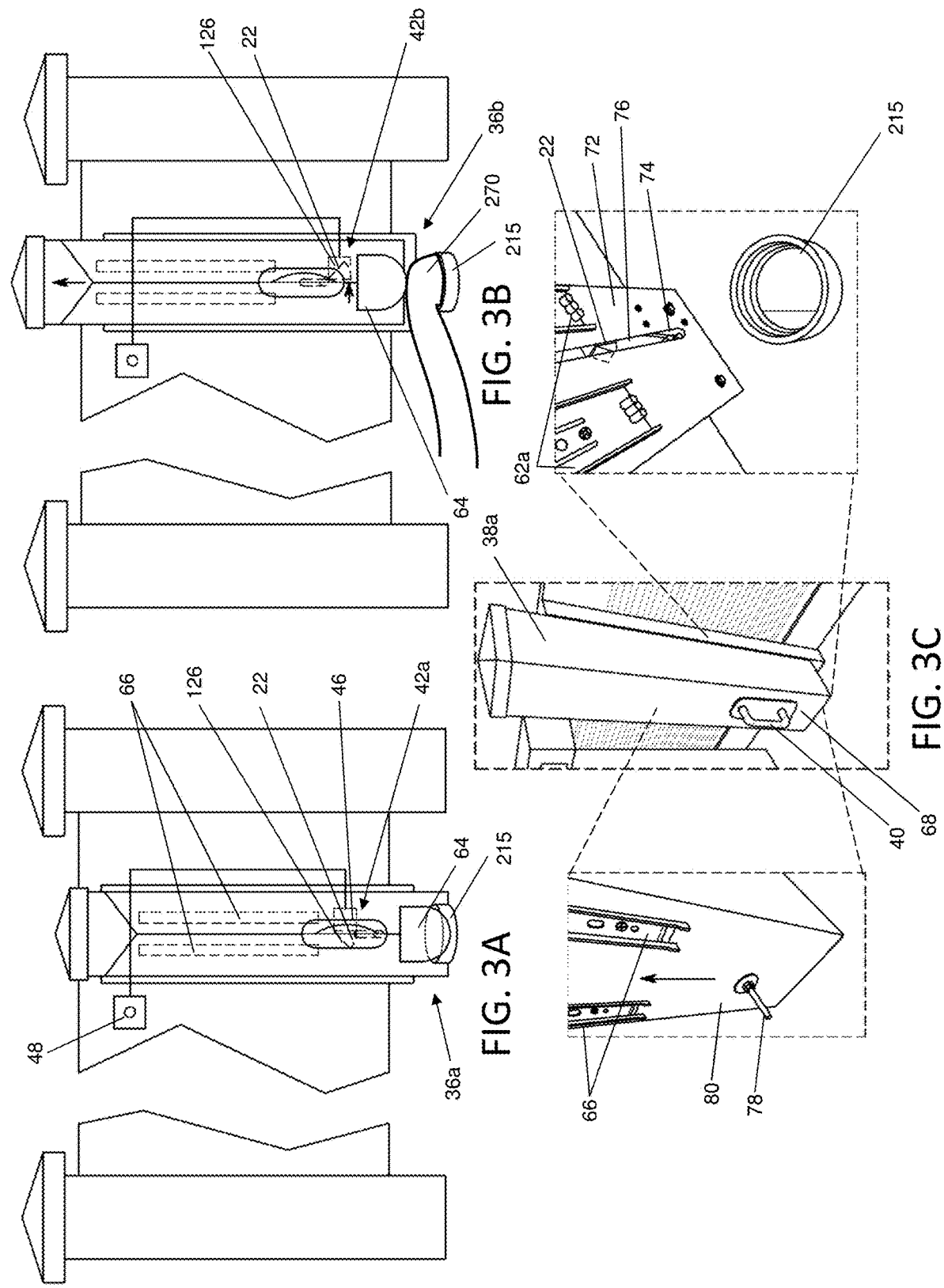

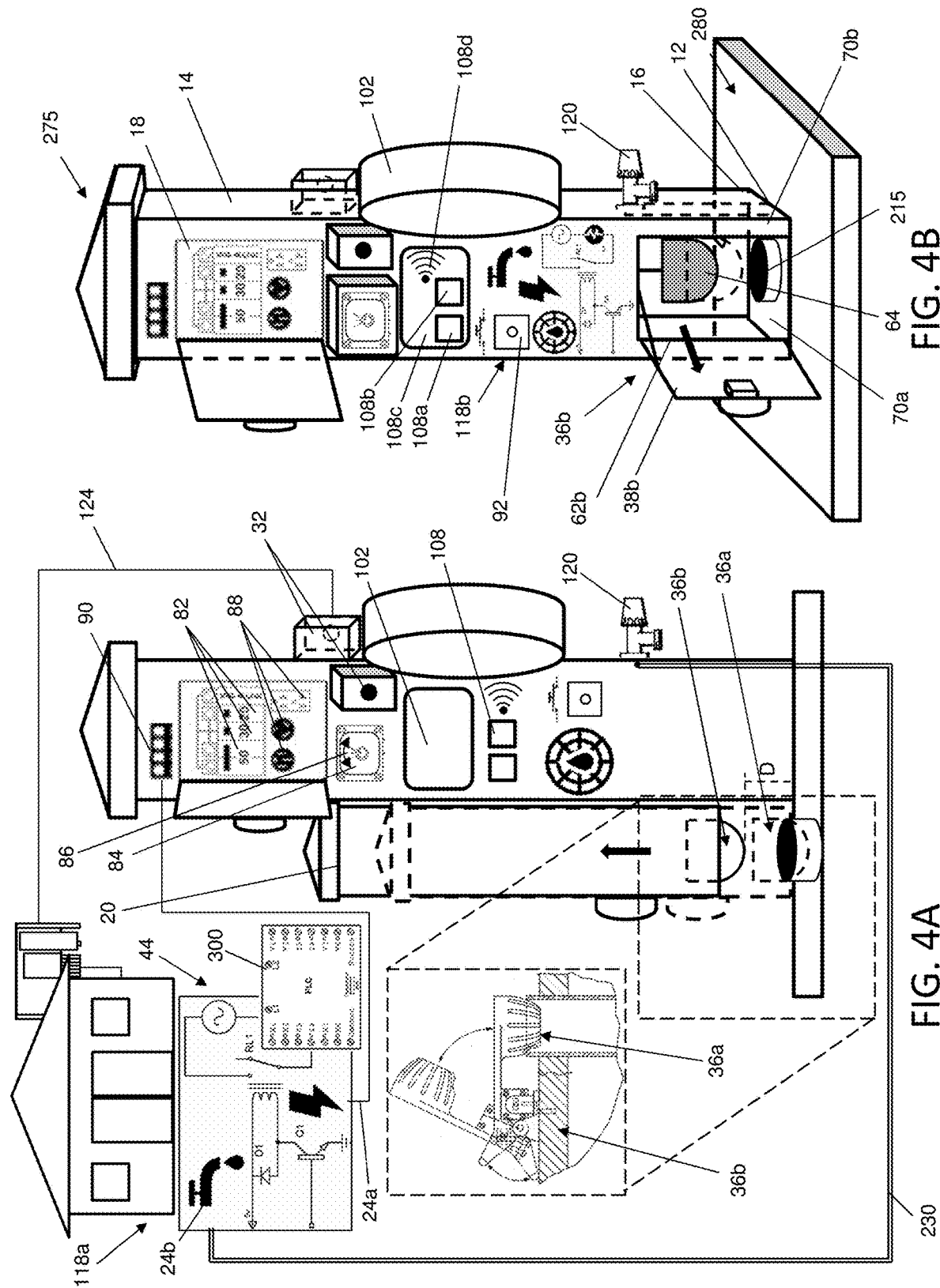

AUTOMATED SYSTEMS FOR RECREATIONAL VEHICLE PARKING FACILITY

CROSS-REFERENCE TO RELATED APPLICATIONS

This application claims priority from U.S. Provisional Pat. App. No. 63/018,441 filed on Apr. 30, 2020, respectively, which are hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present invention relates to methods and systems for remotely reserving and managing recreational vehicle parks, and more particularly to automated services provided by hookup pedestals and remote control systems for activating and deactivating the utility services provided by the hookup pedestals.

Related Art

Traditional parking facilities for recreational vehicles (RVs) have multiservice hookup pedestals which provide utility services with connections to electrical power, potable water, and sewer access. Examples of multiservice hookup pedestals are described in U.S. Pat. Nos. 6,844,716 and 9,048,636 which are incorporated by reference. Additionally, many of these RV parking facilities have automated reservation systems that allow guests to select a parking site with arrival and departure times and to pay in advance for the period of time that the parking site is being rented. Most of these RV parking facilities have an onsite manager, attendant or other staff who can prevent unauthorized users (freeloaders) from accessing parking sites that have been reserved by the paying guests and who direct the guest to their reserved parking site. The attendant may also activate the utility services that are provided through the particular hookup pedestal for the reserved parking site. As explained below, some hookup pedestals also allow for self-service operation with an automated activation when a user is at the parking facility and pays for the parking site through a local terminal. These self-service hookup pedestals allow the user to activate the utility services for a period of time without the need for an onsite attendant, but they are not integrated with an automated reservation system.

Parking facilities have used automated and remote monitoring with reservation systems and self-service-payment kiosks for decades, and these parking facilities have incorporated sensors that detect the locations of vehicles in parking spaces and/or the occupancy status of particular parking spaces, such as disclosed in U.S. Pat. No. 5,432,508. Parking facilities have also been known to include self-service hookup pedestals that provide utility services, such as the electrical power hookup pedestals in U.S. Pat. No. 5,451,755 which suggests the benefits of providing an electric power outlet for trailer camping. Similarly, US Pat. App. Pub. No. 2008/0304212 discloses an automated self-service hookup pedestal for electrical services which can be operated by a driver who pulls into the RV parking facility. However, the '755 Patent and '212 Application require payment at a local kiosk or central transaction interface point in order to activate the utility services through the hookup pedestal, and there is no system which integrates the automated reservation and parking system functionality with the activation of multiservice hookup pedestals corresponding with respective reservations. Accordingly, modifications would need to be made to automated parking facilities with reservation systems to integrate multiservice hookup pedestals that are activated when a guest arrives without any need for an attendant; additionally, for such an integration, known hookup pedestals would also have to be modified.

Even with the advances and innovations that have been made to automate the management of recreational vehicle parking facilities, there has remained a need for improved hookup pedestals that can be integrated with automated reservation and remote control systems. In addition to the automated self-service hookup pedestals for electric power referred to above, there have also been self-service hookup pedestals for other utility services, such as sewer service. For example, U.S. Pat. No. 9,010,358 discloses a self-service control panel that operates a locking inlet cover for an automated dump station. According to the '358 Patent, the inlet cover has an electrically powered latching mechanism, and when a payment is made, the control panel powers the latching mechanism so that it is unlocked for a short, limited period of time which gives the user sufficient time to open the inlet cover and connect the end of the RV's waste hose into the dump station's inlet tube in the space between the open inlet cover and the inlet tube (on the order of a couple of minutes). When the waste hose is connected to the inlet tube, it prevents the inlet cover from closing which is critical because at the end of the short time period the latching mechanism is moved back to its locked configuration, and the entire operation to empty the RV's waste tank(s) takes longer than the short time period provided for opening the inlet cover and placing the waste hose into position over the inlet tube.

The '358 Patent is particularly directed to an automated dump station that is separate from the RV parking site which has the hookup pedestal that is used for ongoing utility services while the RV is parked for a long period of time, on the order of hours, days, or weeks. Accordingly, the self-service, automated dump station service disclosed in the '358 Patent is not integrated with the other utility services. If the self-service, automated dump station were to be integrated into a hookup pedestal with other utility services that are rented for hours, days or weeks, it is likely that the renter might want to empty the waste tanks at the beginning of the rental period as well as towards the end of the rental period, and for the longer rental periods, the waste tanks may need to be emptied multiple additional times. Without modification to the '358 Patent's dump station service, even if the inlet cover is unlocked for the first couple of minutes of the rental period and is opened during this short time for the initial placement of the waste hose, the renter would have to make additional payments for subsequent evacuations or would have to wedge the inlet door open which would allow odiferous and noxious fumes to escape from the waste pipe. Wedging the inlet door open is also risky for the facility operator because while the renter may be on an excursion during the rental period, if the renter has wedged the inlet door open, a freeloader could use the dump station at the parking site. Accordingly, there remains a need to modify hookup pedestals so that all of the utility services are active and available for the entire duration of the rental period.

In a number of different industries, smart switches, such as disclosed in U.S. Pat. No. 6,002,340 which is incorporated by reference, have been integrated in a number of innovative ways with programmable logic controllers (PLCs), micro-controllers, sensors, and different types of electrically powered motors, solenoids, and other actuators for operating latches, valves, and other mechanisms that are used in control systems to provide automated, remote control operation for equipment corresponding to the particular industries. Although smart switches and sensors have been used for decades to remotely control electrical power systems, electronic communication systems, potable water systems, and sewage systems, the limited uses of smart switches and sensors in hookup pedestals have mostly focused on self-service systems in which a single utility service is automatically activated at the time that a payment is made at the hookup pedestal or at a central processing location at the particular parking facility. As indicated above, currently known self-service hookup pedestals cannot be integrated into automated reservation and remote control systems for multiple parking facilities without modifying their operation. Accordingly, there has also remained a need for improved hookup pedestals that can be distributed in one or more RV parking facilities and function in coordination with a central command console that manages the automated reservation system as well as the remote control systems.

Preferably, the improved hookup pedestals would provide for multiple utility services, particularly including electrical power systems, potable water systems, and sewage systems, which can be all be activated or deactivated based on the reservation information maintained by central command console as well as sensor information and/or user input from each particular hookup pedestal. It would be preferable for all of the utility service to be activated and de-activated automatically upon arrival and departure, respectively, of the guests who are the users of the services while the parking facilities are remotely managed and overseen by off-site staff without any onsite staff required. Although wireless communications may also be provided through the improved hookup pedestals, it is less important than electrical power, potable water, and sewer connections because of the ubiquitous use of smartphones over expansive mobile phone networks and ability to use a smartphone as a personal hotspot. Accordingly, in remote locations, it may be more beneficial to ensure the RV parking facility is within the operable range of a mobile phone tower or to build one as a part of the infrastructure for the RV parking facility.

SUMMARY OF THE INVENTION

The invention described herein is an automated system providing remote monitoring, control, communication, and management of a recreational vehicle parking facility and provides guests access to electric, water and sewer services via onsite hookup pedestals. In operation, the system enables a guest to make a reservation and contract and pay for a parking site that has a hookup pedestal for electric, water, and sewer services and subsequently access the same without the need for onsite assistance. The parking facility itself includes a physical infrastructure including electrical lines, potable water mains, sewer waste pipes, lighting towers, wireless communication stations, video cameras as well as the roads and the RV parking spaces. To provide remote access for each guest at that various sparking sites, each parking space includes an adjacent multiservice hookup pedestal capable of providing at least one of electric, water and sewer services to the guest.

The system is fully automated and does not necessitate manual intervention by staff yet protects against unknown and unwanted guests using electric, water, and sewer services. Each parking space is continually monitored by local sensors capable of detecting when a vehicle is present in a space to allow the host computer system to determine if a guest is properly occupying the space during a reserved stay or if the space should be vacated. In addition to providing various utility services, the hookup pedestals may also include communication interfaces that allow the host computer system to automatically communicate with the guest to confirm their reservation, notify them if they are in the wrong space, or warn that they are present without a reservation and action may be taken against them. In operation, these local sensors operate on a continuously closed circuit and thereby monitor each space separate from the power circuits operating the hookup pedestals. Accordingly, even if a guest is parked in a space without a reservation, they cannot use any of the utility services which are only activated once the guest is verified by the system.

Provided it is determined that a guest is properly parked in their assigned space, the host system sends instructions to programmable logic controllers (PLC) corresponding with the hookup pedestal and subsequently activate the same on an electrical circuit separate from the local sensors. Thus, until instructions are sent by the PLC, no power is provided to the hookup pedestal and water, electric and sewer services are unusable. Once instructions are provided, a smart switch closes the power circuit to power an electrical panel that can subsequently be used by the guest to deliver power to their RV or for any other need they may have. Similarly, another smart switch may activate a smart water valve to open the valve and allow water to flow at various rates from the water hydrant. Finally, the smart switch may also power a manual switch that is in operative communication with a sewer inlet cover latch. Once operational, the guest can engage the manual switch to release the latch and subsequently lift the sewer inlet cover so that they may hookup their gray or black water hoses and dump sewage.

Although water and electric supply are simply turned off until instructions are provided to the hookup pedestal to turn on the same, the sewer inlet could be passively used by unverified guests. Accordingly, a particular aspect of the sewer inlet cover includes an innovative lockdown feature that limits the access to the dump station inlet and only allows for the release of the inlet cover when the smart switch for the electric power service is activated. Generally, when the control system provides power to the hookup pedestal, the electric circuit to the manually actuated switch is powered so the guest can operate the manually actuated switch to unlock the latch and open the inlet cover. When the inlet cover is opened, the waste hose from the RV is placed into the space between the inlet cover and the opening to the dump station inlet and can be connected to the inlet end of the sewer waste pipe. However, until the manually actuated switch is powered by the electric panel upon verification of the guest by the system, the manual switch is dead and will not unlock the latch.

The integrated and automated reservation and control system is another innovative aspect of the present invention which builds on the known automated reservation system by integrated it with the automated control system that uses reservation information along with the sensor information at the parking facility and the controllers for the smart switches and smart valve to automatically control the utility services at the parking sites without necessitating intervention by any staff that can be onsite of offsite. The automated system allows for manual override of the utility services and other interventions by the staff as situations can arise that are more suited to human interaction, communication, and control.

In yet another aspect of the present invention, the business method of the present invention maximizes the use of the lot for the RV parking sites and hookup services, minimizes the use of the lot for communal services, and eliminates any need for an onsite manager or other staff.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings.

FIGS. 2B and 2C are schematic representations of the multiservice hookup pedestal shown in FIG. 2A in an inactive state and in an active state, respectively.

FIGS. 3A and 3B are detail views of the sewer cover device for the multiservice hookup pedestal shown in FIG. 2A in a closed position and in an open position.

FIG. 3C is a perspective view of the sewer cover device with detail views of the mounting bracket and the sliding post.

FIGS. 4A and 4B are simplified schematic representations of alternative embodiments of the multiservice hookup pedestal according to the present invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
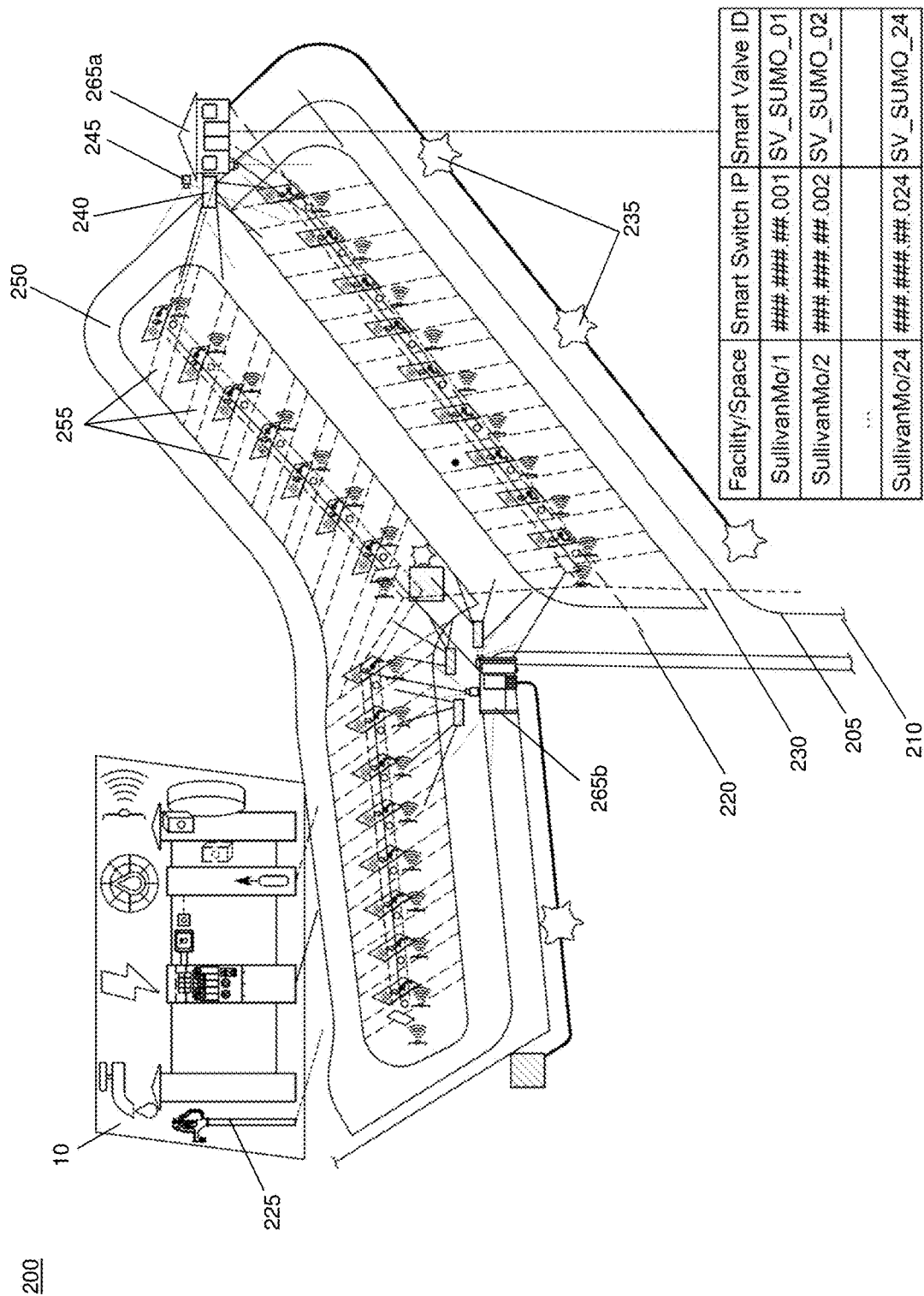
FIG. 1 is a schematic representation of an RV parking facility with infrastructure distribution systems for multiple services and multiservice hookup pedestals of the present invention.

The automated and remote control system for multiservice hookup pedestals allows for remote management of the reservations and hookup utility services at multiple recreational vehicle (RV) parking facilities throughout the United States and Canada. The physical integration of the multiservice hookup pedestals into the RV parking facility's infrastructure is shown in FIG. 1 as a part of a site map. Particular features and functions of the multiservice hookup pedestals are described in detail below with reference to FIGS. 2-4, and FIGS. 5A and 5B illustrate the integration of the multiservice hookup pedestals into an automated parking site reservation system and an automated control system for the activation and deactivation of the utility services that are provided through the corresponding multiservice hookup pedestals.

As will be evident from the description of the different embodiments of the hookup pedestals below, the improved structural features and automation elements in the multiservice hookup pedestals allow for the integration of automated activation and deactivation of the utility services that are available through the hookup pedestals and also allow for one or more remote attendants to override the automated controls for the hookup pedestals. It will be appreciated that the improved multiservice hookup pedestals can also be used in traditional RV parking facilities in which an attendant activates and deactivates hookup pedestals, such as by flipping physical switches on a control panel or virtual switches in a control software program which correspond to the respective hookup pedestals to provide the utility services.

The automated reservation software system used for multiple RV parking facilities in the present invention is similar to currently known automated reservation systems for parking facilities. Additionally, the functionality of RV parking facilities' physical infrastructure is similar to currently known ground-level RV parking facilities, although as discussed below, some features are modified to maximize the parking spaces for the size of the overall facility. For the reservation system, a computer software program automatically makes parking site reservations for guests according to the availability of parking sites at the RV parking facilities, provides rental agreements with the guests for the duration of their stays (number of hours, days, or weeks), and processes the rental payments for guests. The return receipt for each reservation preferably includes customized instructions for the individual guest for their specific stay, particularly including the parking site that will have the hookup services activated for their stay.

The unique features of the present invention allow the integration and use of the information from the automated reservation system with information from sensors and/or user inputs in an automated control system that activates and deactivates the utility services provided through the multiservice hookup pedestals using smart switches and smart valves along with manually actuated switches and manually actuated valves that are in series with the corresponding smart switches and smart valves, respectively. As used throughout this description of the invention, smart switches generally refer to electronically controllable switches and smart valves refer to an electrically actuated valve that is controlled by a smart switch. Accordingly, as described in detail below, the innovations for the present invention are primarily in the features and functionality of the multiservice hookup pedestal and in the components and operation of the control system. The control system includes one or more programmable logic controllers (PLCs) to process the reservation system information and the sensor information and determine whether or not an active status signal should be communicated to a particular multiservice hookup pedestal. When the PLC communicates the active status signal to the multiservice hookup pedestal receives, the smart switch and the smart valve are activated.

RV Parking Facility Infrastructure

As shown in FIG. 1, the RV parking facility's physical infrastructure 200 includes electrical lines 205, potable water mains 230, sewer waste pipes 220, lighting towers 235, wireless communication stations 240, video cameras 245 as well as the roads 250 and the RV parking spaces 255.

Each RV parking site has the parking space for the RV along with an adjacent multiservice hookup pedestal; preferably, the hookup pedestals are positioned in service islands 260 that are slightly elevated from the surface of their corresponding parking spaces. The multiservice hookup pedestals each connect to the utility services that are provided to each one of the RV parking sites, namely, at least one electrical line transmissively connected to the electric power grid 210, a dump station inlet 215 fluidly connected to the sewer pipe, and a plumbing fixture 225 fluidly connected the potable water mains. The electric power lines are preferably contained in conduits along with communication/control wires that are connected to the sensors that are connected to or proximate to the hookup pedestals. The lines, wires, mains, pipes, and conduits for the utility services extend below and between the hookup pedestals and preferably extend to a control building 265*a*, and the electric power and communication/control conduits may also extend to an electric power distribution control box 265*b* that is separate from the control building. The control building preferably contains one or more programmable logic controllers (PLCs) 300 that are a part of the control system, and the electric power distribution control box may also have PLCs. The RV parking facility also preferably includes backlit instructional signage that can be used to provide instructions to guests, visitors, service providers, and others.

According to the different configurations of the hookup pedestals described in detail below, the smart switches and smart valves could be centrally located as a group at the parking facility proximate to the hookup pedestals but not within the hookup pedestal housings, such as in the control building. Alternatively, the smart switches and smart valves may be distributed to each of the hookup pedestals so they are located within the housings of the corresponding hookup pedestals. Each one of the smart switches and smart valves preferably has its own unique internet protocol (IP) address or other unique identifier. Accordingly, for those RV parking facilities which use hookup pedestals that each contain the smart switches and smart valves within their respective housings, the PLCs could be remotely located from the parking facilities so the computer control for multiple RV parking facilities could be centralized, and there may not be a need for a separate control building or electric power distribution control box at the individual parking facilities. It will also be appreciated that the sensors, smart switches, and smart valves could communicate wirelessly so instead of using communication/control wires extending to each one of the hookup pedestals to communicate with the PLC, these electronic devices would communicate through the wireless communication access points.

Although there may be some space in the parking facility that is used for communal services, such as a trash bin, a dog park, and possibly some vending machines, the area of the parking facility is preferably maximized for the space available to the RV parking sites. Accordingly, there is preferably no pool or shower house that could be shut down during a pandemic nor is there any store or clubhouse that would require an attendant or other onsite staff. To help maximize the use of the space for the RV parking sites, the parking sites are pull through from wide side roads with easy angles and nearly-level parking sites so there is no backing necessary anywhere in the parking facility. Additionally, the parking sites are preferably arranged in rows of parallel parking spaces with the corresponding adjacent multiservice hookup pedestals. The business model of the RV Self-Park® parking facilities is not a traditional campground type of facility in which the green spaces between parking sites are larger than the parking spaces. In comparison, the RV Self-Park® parking facilities would have small green spaces between the parking sites for the hookup pedestals, but the green spaces between adjacent parallel parking spaces would be narrower than the width of the parking spaces, and there may not be enough space for trees or campfires.

Additional infrastructure features of the RV parking facility also support the management, control, and safety of the guests, their vehicles, and the RV parking facility equipment and property. For example, video cameras are strategically positioned as are the WiFi access points for real-time monitoring and wireless communications throughout the parking facility. The camera wiring conduits extend around the periphery of the parking facility, and street lights are anchored with concrete bases. Video feeds from the cameras can be transmitted over a computer network to an offsite attendant for remote monitoring of the RV parking facility and can also be streamed online to the guests of the parking facility which also allows for private viewing of the images while guests remain within their parked vehicles. The video feed can also be shown on monitors behind the windows of the control building. The control building is securely locked to protect PLCs when they are located at each of the parking facilities as well as the smart switches and the smart valves when they are centrally grouped and other equipment for the facility that may be stored in the building. The control building could be a small shack that also includes an alarm system that would provide a notification to the offsite attendant when there has been unauthorized access to the building or some other violation has occurred; additionally, the RV parking facility may have one or more strobe warning lights that can flash if there has been a violation. When the electric power distribution control box is separate from the control building, the alarm system may also detect whether there has been any forced entry or other tampering issue with the security of the box; similarly, alarms could also be integrated into the hookup pedestals.

Multiservice Hookup Pedestal

Each multiservice hookup pedestal 10 has a base 12, a housing 14 that is connected to the base, and a mounting bracket 16 that can be connected to the base and/or the housing depending on the particular configuration of the hookup pedestal. The housing contains at least an electric outlet panel 18 that has one or more electrical outlets for the electric power service. An inlet cover 20 to the dump station inlet is connected to the mounting bracket, and a latch 22 to the inlet cover provides for controlled access to the sewer service. The inlet cover moves between a closed position 36*a* and an opened position 36*b*, blocking the dump station inlet in the closed position and spaced a distance (D) from the dump station inlet in the opened position. The latch has a locked configuration 42*a* that prevents the inlet cover from moving from the closed position to the opened position and an unlocked configuration 42*b* allows the inlet cover to move from the closed position to the opened position. The latch's configuration between the open and closed positions is preferably operated by an electrically powered latch actuator 46. The multiservice hookup pedestal also has a hydrant 120*a* with a spigot or faucet 120*b* and a manually actuated valve 120*c* that is connected to the potable water service through a water line.

Figure 2A:
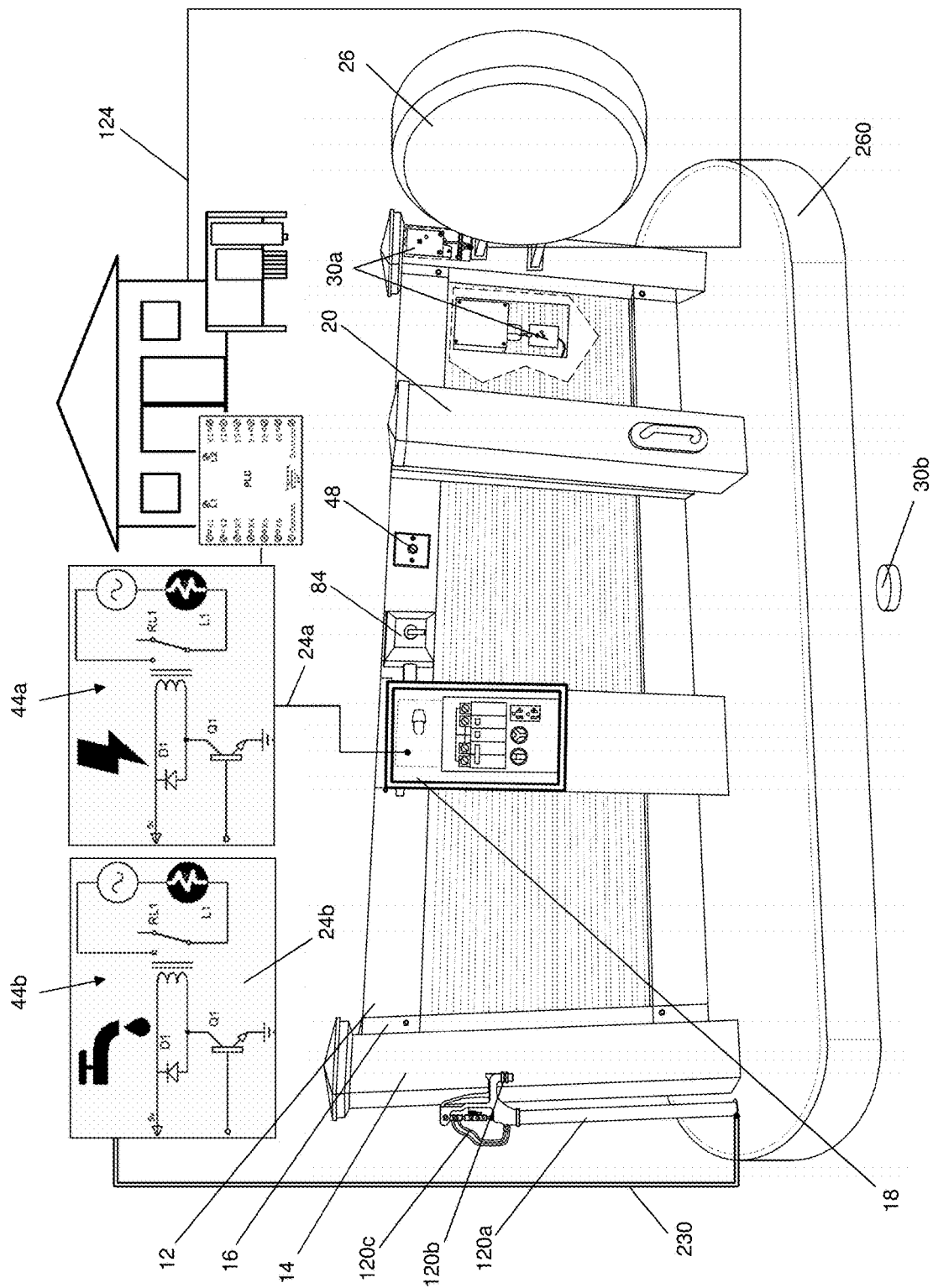
FIG. 2A is a perspective view of a first embodiment of the multiservice hookup pedestals according to the present invention.

As generally shown in FIG. 2A and particularly shown in FIGS. 2B and 2C, the multiservice hookup pedestal has multiple electric power circuits. The electric circuit 124 for the sensors that are used to determine the presence of a vehicle in the parking space is always powered, whereas the electric circuit 24*a* between the smart switch and the electric outlet panel (i.e., the electric service smart switch) is only powered when the PLC communicates the active status signal to the hookup pedestal's electric service smart switch. The latch actuator and the manually actuated switch 48 are also on the electric circuit with the electric outlet panel that is controlled by the electric service smart switch. Accordingly, the electric service smart switch 44*a* is in series on the electric circuit with the electrical power line on one side of the circuit and the electric outlet, the manually actuated switch, and the latch actuator on the other side of the circuit.

As shown in FIG. 2B, the smart switch is in its open state 50*b* which prevents any electric transmission from the electric line to the electric outlet panel, the manually actuated switch, and the latch actuator. The electric service smart switch is shown in its closed state 50*a* in FIG. 2C when the PLC provides the active status signal; in its closed state, the smart switch provides an electric transmission 52 from the electric line to the electric outlet panel and the manually actuated switch. The manually actuated switch is situated in series between the smart switch and the latch actuator, having an off-position 54*b* that keeps the circuit to the latch actuator open and prevents it from being powered by the electric transmission and having an on-position 54*a* that closes the circuit and provides the electric transmission to power the latch actuator. The latch actuator is operatively connected to the latch so that when the latch actuator is in its powered condition 56, it forces the latch to move between the locked configuration and the unlocked configuration.

As with other hookup pedestals, the electric power circuit includes a circuit breaker 90 and preferably includes multiple electrical outlets 88 and a rotary changeover switch 84 as an electric service selector 82. In particular, the electric service selector allows the guest to choose between 30/20 Amp electric power and 50 Amp electric power according to the corresponding knob positions 86 and the respective sets of electrical outlets. However, unlike other hookup pedestals, the electric power circuit also controls the electronically actuated latch that holds the inlet cover over the dump station inlet as described above. It will be appreciated that the use of the smart switch in combination with the manually actuated switch to selectively power the electronically actuated latch for the inlet cover could be incorporated into existing hookup pedestals as an improvement. For example, the hinged inlet cover disclosed in the '358 Patent could be modified according to aspects of the present invention to use the manually actuated switch and incorporated into the hookup pedestal disclosed in the '212 Published Application. It will also be appreciated that there could be other inlet covers, latch mechanisms, and release switches that would provide the sewer lockdown feature of the present invention. For example, as shown in the alternative view of FIG. 4A, a hinged inlet cover may rotate between the lowered position and the raised position such as disclosed in the '358 Patent and could have a latch that rotates toward and away from the inlet cover or could have a latch that extends and retracts like a deadbolt. In another alternative hookup pedestal configuration, an access door 38*b* on a hinge 62*b* could serve as the inlet cover, such as shown in FIG. 4B. Accordingly, different types of electrically actuated latches could be used with various types of inlet covers.

The smart switches are preferably operated by multi-channel relay controllers for single pole double throw (SPDT) solid state switches and preferably use a standard communication protocol, such as I2C serial communication. The preferred operation of the smart switches allows for chaining together relay controllers as well as sensors and other electrical equipment, such as pulse width modulated (PWM) drivers. The relays are biased-open 58 in their nonconducting open state when the PLC does not provide the electrical relay signal 60 corresponding with the active status of the smart switch. As explained above, the smart switches can be located in the control building or electric power distribution control box at the parking facility proximate to the hookup pedestals or within the housing of the hookup pedestal.

The latch is preferably biased by a spring 126 to its locked configuration with the moving portion of the latch is forced outwards relative to the housing. The latch actuator is preferably a solenoid that is positioned within the housing and forces the latch to its unlocked configuration when the solenoid is powered. In operation, when the PLC provides the active status signal, the smart switch allows the transmission of the electrical power to the manually actuated switch which is preferably biased open to the off-position, such as with a spring-loaded pushbutton switch 92. Since the pushbutton switch is biased open 58, the latch actuator remains unpowered until the pushbutton switch is depressed to the on-position to close the circuit and power the solenoid. When the latch is unlocked, the inlet cover can be moved to its open position. The pushbutton switch preferably has a light that is lit when the electric service smart switch is in its closed state so that there is a visual indicator to the guest that the electrical power has reached the pushbutton switch even when it is in the off-position, and the latch to the inlet cover can be unlocked by depressing the pushbutton switch to its on-position. Additionally, it will also be understood that a spring-loaded toggle switch or any other biased-open manually actuated switch could be used in place of the pushbutton switch to release the latch.

Another smart switch 44*b* in communication with the PLC is used to control the electrically actuated valve to create a smart valve 28. The smart switch is situated in series between the electrical power line and the electrically actuated valve. When PLC sends the active status signal to the smart switch, the smart switch is closed so that power is provided to the electrically actuated valve which moves the valve to an open flow state 94*a*. The electrically actuated valve is connected to and in fluid communication with the potable water service (i.e., water main) through the plumbing fixture 120. As with the electric service smart switch, the potable water smart switch can be located within the hookup pedestal's housing or can be within the control building at the parking facility proximate to the multiservice hookup pedestals. Accordingly, the smart valve can be located in the control building at the beginning or in the hookup pedestal's housing the end of the water line running from the control housing to the corresponding hookup pedestal. Regardless of location of the smart valve, the hookup pedestal has a water line within its housing that connects to the manually actuated valve so the manually actuated valve is fluidly connected to the smart valve. When the electrically actuated valve is in its closed flow state 94*b*, there is no water flow to the manually actuated valve, and when the electrically actuated valve is in the open flow state, the manually actuated valve has a range of flow rates between a no-flow rate and a full-flow rate, inclusive.

Rather than opening or closing a smart valve with a single solenoid, the smart valve preferably uses an electric motor which actuates the valve mechanism to be either in the open state or a closed state. An example of a smart valve with an electric motor is described in U.S. Pat. No. 9,057,453 which is incorporated by reference. Once the valve has been placed into its desired state, electrical power is no longer needed to the electric motor. In comparison, in a valve that is biased closed or biased open and uses, the single solenoid would have to be continually powered to change the state of the valve from its biased state of operation. It will be appreciated that a valve mechanism that is neither biased open nor biased closed could be actuated open by one solenoid and actuated closed by another solenoid so that the solenoids only need to be powered when changing the state of the valve, similar to the electric motor. Accordingly, the second smart switch in the second electric power circuit 24b powers the electrically actuated valve to a closed flow state when the programmable logic controller either provides an inactive status signal 100a or does not provide an active status signal 100b. As in the '453 Patent, the PLC may send an open-valve signal or a close-valve signal to place the smart valve in either a flow configuration or a shut configuration, either allowing water to flow from the water main to the manually actuated valve at the respective water spigot in the activated hookup pedestal or preventing the flow. It will be appreciated that just as the smart valve can use an electric motor drive to actuate the valve mechanism, an electric motor can be used to open the inlet cover, and in such a case, it would be preferred for the manually actuated switch to either release the inlet cover so it rests on the elbow end of the waste hose to hold the hose in place while it is connected to the dump station inlet or reverse the motor and close inlet cover to prevent the escape of odiferous and noxious fumes when the waste hose is removed from the dump station inlet.

The vehicle sensor 30 and a micro-processor communicate 34 with the PLC and are connected to at least one of the base, the housing, and the bracket. As explained above, the vehicle sensor and the micro-processor are electrically connected to the electrical power line in a separate electrical circuit without regard to any status signal provided by the PLC to the smart switch for the electric service provided through the multiservice hookup pedestal. The vehicle sensor determines a vacant status 96a or an occupied status 96b as the parking site occupancy status in the parking space proximate to the vehicle sensor, and the vehicle sensor communicates the parking site occupancy status to the PLC. The multiservice hookup pedestal may use different types of vehicle sensors, such as a pair of through-beam sensors, an in-ground sensor, a machine vision sensor, and/or an infrared reflective sensor.

As particularly shown in FIGS. 2A-2C, a pair of through-beam sensors 30a are combined with an in-ground sensor 30b. The in-ground sensor is preferably a magnetic sensor operating in association with vehicle detection algorithms as is generally known for parking facilities. The through-beam sensors operate in pairs with one of the sensors being attached to the front side of the hookup pedestal and facing forward towards the parking space corresponding with the hookup pedestal on which the through-beam sensor is mounted while the other through-beam sensor is attached to the back side of the hookup pedestal and facing backward towards the hookup pedestal in the adjacent parking site. For the parking site at the end of the row where there is no parking site adjacent to the backside of the hookup pedestal, a separate post on the opposite side of the parking space holds the through-beam sensor that would have been on the back of the hookup pedestal on the adjacent parking site. Accordingly, it will be appreciated that the sensors for the parking space do not necessarily need to be attached to the hookup pedestal to which the sensor is associated for the determination of the parking site occupancy status.

Each one of the multiservice hookup pedestals is also equipped with a line-load sensor 32 that monitors the level of electrical power usage through the electrical panel at the corresponding RV parking site. Traditionally, hookup pedestals for electrical power service use line-load sensors and/or an energy meter when a user prepays for a particular amount of energy, such as in the '755 Patent, so the amount of energy supplied through the hookup pedestal is limited according to the amount that has been purchased. As explained below with regard to the automatic control system of the present invention, the line-load sensor of the present invention is used in a different way. According to the present invention, the level of electrical power usage according to the line-load sensor is evaluated along with the remaining time in a reservation window and the parking site occupancy status to determine the availability of the parking site for the automated reservation system.

The multiservice hookup pedestal can also include a parking site status sign 26 which communicates with the micro-processor and/or the PLC to provide different visual indicators 104 depending on whether the parking site is vacant or has either an authorized occupant 104b or an unauthorized occupant 104a. For example, the micro-processor or PLC may determine an unauthorized vehicle condition for the parking site when the parking site occupancy status is the occupied status, but the PLC has not provided the active status signal. When the parking site is vacant, the parking site status sign may be unlit or lit with white light, and the parking site status sign can be lit with a green light for the authorized occupant and or a flashing red light for the unauthorized occupant. Since the parking site status sign functions even when the PLC has not provided the active status signal, it is evident that the parking site status sign is electrically connected to the electrical power line on the same electrical circuit as the sensors, i.e., without regard to any status signal provided by the PLC. It will also be appreciated that there could be a display screen 102 on the multiservice hookup pedestal which provides messages depending on the occupancy determination for the parking site. In combination with the visual indication provided by the parking site status sign, a speaker 106 could provide an audible warning of the unauthorized vehicle condition.

The multiservice hookup pedestal may also include a user interface device 108, such as a keypad entry 108a, a credit card reader 108b, a touchscreen display 108c, and/or a wireless communication module 108d that can be used to positively confirm an arrival of an authorized guest and may also be used when the guest has completed the stay and is departing. The user interface device is electrically connected to the electrical power line on the same electrical circuit as the sensors, i.e., without regard to any status signal provided by the PLC, and when the positive user identification is input into the user interface device, the user input devices communicates the information to the PLC.

The multiservice hookup pedestals shown in FIGS. 2 and 4A has the water hydrant and the inlet cover on opposite sides of the housing for the electrical outlet housing. In the multiservice hookup pedestal shown in FIG. 2, the water hydrant is spaced from the inlet cover by a distance that is greater than the height of the electrical outlet housing. This embodiment of the hookup pedestal has posts on opposite ends with a half-wall panel connected to the posts and between the posts. The span of the half-wall panel is more than twice the height of the posts. Preferably, the posts are made from a vinyl plastic material that is preferably reinforced with metal. It will be appreciated that the posts may be made out of other materials, including other elastomeric materials, composite materials, and/or metals, such as aluminum. Similarly, the half-wall panel, housing, brackets, and other structural elements can be made from sturdy, weather-resistant materials.

As explained above, the multiservice hookup pedestals have an innovative lockdown feature for the inlet cover that limits the access to the dump station inlet that only allows for the release of the inlet cover when the smart switch for the electric power service is activated. Generally, when the control system provides power to the hookup pedestal, the electric circuit to the manually actuated switch is powered so the guest can operate the manually actuated switch to unlock the latch and open the inlet cover. When the inlet cover is opened, the waste hose 270 from the RV is placed into the space between the inlet cover and the opening to the dump station inlet and can be connected to the inlet end of the sewer waste pipe. The inlet cover can be lowered onto the elbow end of the waste hose to hold it in place. Preferably, when the spring-loaded switch is released, it moves back to the off-position and electric power is immediately cut to the latch actuator so the latch is biased back into its locking configuration. Accordingly, in the preferred embodiment, the cover should be raised while the power is on and the latch is released so the locking mechanism in the cover is raised past the latch, and the waste hose elbow is placed over the dump station inlet under the cover, preventing the inlet cover from lowering back onto the dump station inlet with the latch again locking. It will also be appreciated that the spring-loaded switch may also be connected to a relay with a timer which closes the circuit to the actuator for a set period of time as in the '358 Patent. When the waste hose is removed from the space between the cover and the opening to the dump station inlet, the cover is lowered back down to onto the inlet and the latch again locks the cover in its closed position. According to the features of the present invention, at any time during the reservation window when the smart switch is activated, the manually actuated switch can be moved to the on-position to activate the latch actuator and release the inlet cover.

According to the particular embodiment of the hookup pedestal shown in FIGS. 3A-3C, the inlet cover is a post 38a that slides on the mounting bracket between the lowered position 36a and the raised position 36b. The post is larger in size than the dump station inlet so the bottom end of the post surrounds the dump station inlet when the post is in the lowered position. The mounting bracket is a track 62a that is attached to a panel section 72 that is fastened to the half-wall panel between the end posts. The inlet cover post has a runner 66 that slides relative to the track, a handle 40 connected to an exterior side 68 of the post, and a plug 64 held within an interior space 70a in a bottom section 70b of the post. The plug can be attached by fasteners in the bottom section or it can be hung by chains from an upper section of the post. Regardless of how the plug is attached to the post, it is situated in the dump station inlet when the post is lowered into the closed position and is spaced from the dump station inlet when the post is raised into the opened position. The panel section preferably has an open slot 74 to its interior space 76. The housing for the latch and latch actuator is fastened to the panel section within the interior space, and the post has a bar 78 extending from its outer surface 80 through the slot into the interior space of the panel. As shown in FIG. 3A, the bar is held below the latch when the post is lowered to the closed position with the latch in the locked configuration. As shown in FIG. 3B, the bar is permitted to slide above the latch when the latch is in the unlocked configuration, allowing the post to be raised into the opened position.

More compact configurations of the multiservice hookup pedestal are shown in FIGS. 4A and 4B. Although these compact configurations are shown in a tower arrangement 275, with the height of the hookup pedestal being greater than the width of the hookup pedestal and the base of the hookup pedestals securely fastened to a concrete pad 280, it will be appreciated that the structural arrangement of the equipment and the spacing between the water spigot and dump station inlet as well as their spacing from the electrical panel can vary. According to the preferred embodiment of the latch actuator described above, the manually actuated switch is positioned within reach of the inlet cover's handle. Of course, if the latch actuator is a motor as suggested above, the manually actuated switch can be located beyond the reach of the inlet cover's handle. As shown in FIG. 4A, different types of inlet covers can be used with the hookup pedestal according to the innovative aspects of the invention as described above. In particular, the sliding post described above and the hinged inlet cover disclosed in the '358 Patent are different types of inlet covers that can be integrated into the multiservice hookup pedestal. As illustrated in FIG. 4A, the smart switches and smart valves for the entire set of multiservice hookup pedestals at the parking facility can be physically located together 118a in the control building as described above. Alternatively, as shown in FIG. 4B and also described above, the multiservice hookup pedestals can contain their respective smart switches and/or smart valves within their corresponding housings 118b.

In those multiservice hookup pedestals which contain the relay controller for the smart switch and the smart valve within the hookup pedestal's housing along with the electrically actuated valve, the weather-resistant housing is important to protect the electronic components against the elements. It will also be appreciated that in some environments, the extremes in the outside ambient temperature could be outside the operational temperature ranges for some of these electronic components, particularly including the relay controllers and/or electrically actuated valves. Accordingly, these fully integrated multiservice hookup pedestals may also have environmental control elements that would be found in the control building that house the groups of smart switches and smart valves and the PLC for the multiservice hookup pedestals, such as temperature sensors, heaters, and fans. It is expected that for many RV parking facilities, the centralized grouping of the smart switches and smart valves with the PLC in the control building will be the most efficient way to incorporate the smart switches and smart valves into the multiservice hookup pedestals.

The centralized grouping can be beneficial in retrofitting the multiservice hookup pedestals in existing RV parking facilities with smart switches and smart valves which would improve the automation of the hookup pedestals in the existing facilities. Retrofitting existing hookup pedestals for RV campgrounds and other RV parking facilities with the centralized grouping would improve the efficiency in controlling the hookup pedestals by an onsite attendant and would also allow the hookup pedestals to be controlled by an offsite attendant as in the preferred embodiments of the present invention. Similarly, the centralized grouping can be beneficial when adding the multiservice hookup pedestals to existing parking facilities belonging to service providers of related services that are regularly used by the RV community and already have one or more onsite buildings, such as fuel services and/or maintenance services.

As another application of the multiservice hookup pedestals with the centralized grouping of smart switches and smart valves in the control building, there are many large ground-level parking lots for retail stores which are usually empty at night, and the addition of the multiservice hookup pedestals to a portion of these parking lots in combination with the automated reservation system and automated control could allow guests to schedule short-term, overnight stays when the parking lots are otherwise not being used. Accordingly, the integration of the automated reservation system with the automated control system as generally explained above and described in more detail below for the multiservice hookup pedestals would be an improvement over current systems that are not integrated and do not allow for the automated reservation of parking sites combined with the automated control of the corresponding hookup pedestals. Regardless of the particular type of smart switches, electronically controlled relays, and smart valves used for multiservice hookup pedestals for the parking facility, the computer control program can operate remotely from the parking facility and can send signals to the smart switches and the smart valves through at least one computer control unit or PLC that is preferably housed in the control building or a control room of a building in an existing parking facility.

Automated Systems—Reservations & Control of Services

The computer software program for reserving the RV parking sites that are located at various RV parking facilities is similar to the automated reservation process that have been used for existing RV parking facilities and hospitality and travel services, such as hotels, rental properties, and rental cars. As indicated in the Related Art section above, it has been known for decades that parking facilities could combine automated and remote monitoring with reservation systems and self-service-payment kiosks, and it has also been known for decades that self-service hookup pedestals can be located at the parking sites. However, these known systems require payment at a local kiosk or central transaction interface point in order to activate the utility services through the hookup pedestal, and there is no system which integrates the automated reservation and parking system functionality with an automated control system to activate and deactivate the services available through multiservice hookup pedestals at the parking sites based on the reservation information and sensor information for the parking sites.

Figure 5A:
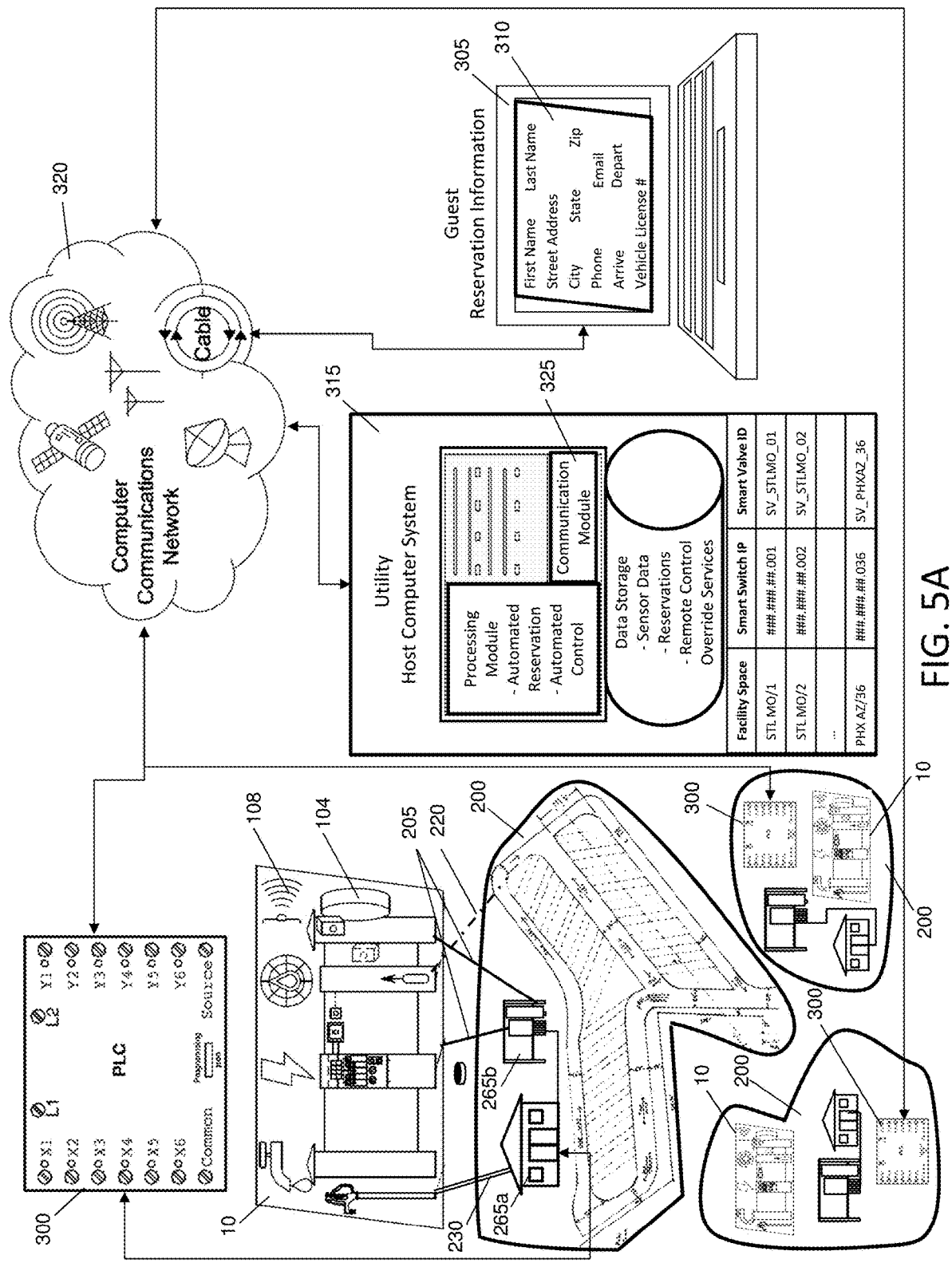
FIG. 5A is a diagram of the integrated automated reservation and control systems communicating with guests and multiservice hookup pedestals at RV parking facilities.

As with current automated reservation systems, guests use the automated reservation system 305 to make their reservations at the RV parking facilities. They can use the reservation system to complete rental agreements for the duration of their stays (number of hours, days, or weeks) and process their rental payments. As generally shown in FIG. 5A, the computerized reservation system has an online reservation portal screen 310 which receives reservation information from the guests through the online reservation portal screen. The computerized reservation system allows guests to select parking sites and the type of parking site (some parking sites have additional amenities to choose from such as a patio or, both, a patio and a gazebo) at the corresponding parking facilities according to the availability of parking sites that the reservation system automatically determines according to the information exchange with the respective guests.

Figure 5B:
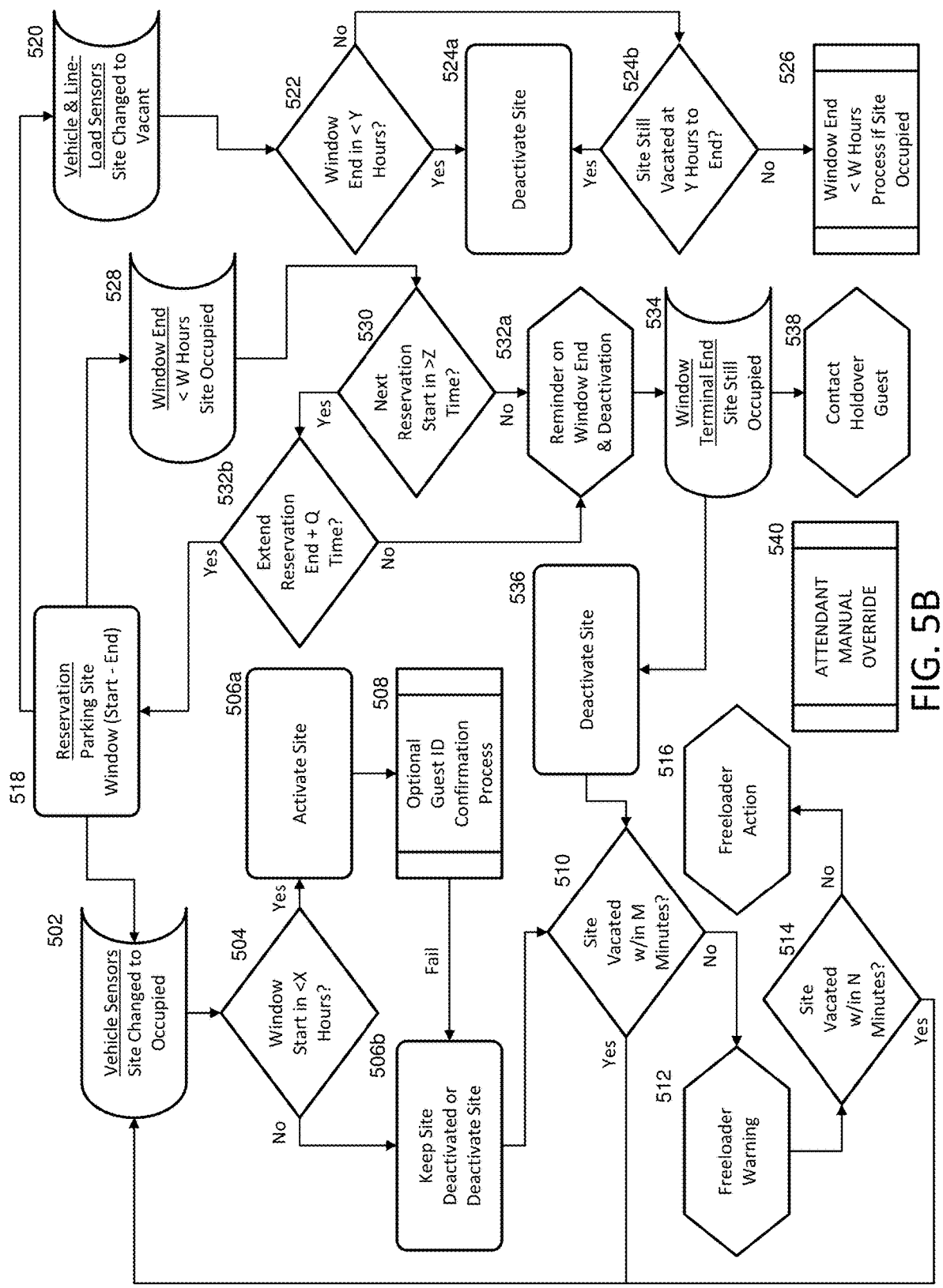
FIG. 5B is a flowchart of logic paths in the automated remote control system.

As indicated above and explained in further detail below, the automated control system 315 is in communication 320 with and uses the information from the computerized reservation system, the PLC for the smart switches and the smart valves, as well as the sensors at the parking facilities. In cooperation with the PLCs at the respective RV parking facilities, the automated control system automatically and remotely controls the utility services that are provided through the multiservice hookup pedestals via communication with the PLC(s). In particular, the communication module for the reservation system 325 and the control system is preferably located remotely from the parking facility and the corresponding parking sites and communicates with the PLCs over a networked system of computers, such as the internet. As shown in FIG. 5B, when a guest has made a reservation and arrives at their assigned parking site, the automated control system follows the logic path to confirm that the activation signal should be sent to the smart switch, electronically controlled relays, and smart valve for the hookup pedestal to activate the utility services. The attendant for the RV parking facilities is preferably located remotely from the facilities and has the authority to override the automated system for activating and deactivating the parking sites.

After having made a reservation through the reservation system, the guest receives a return receipt for the reservation which preferably includes customized instructions for the stay, particularly including the space that will have the hookup services activated for the duration of their reservation, i.e., from the start to the end of the reservation window. In addition to providing information that explains to the guest how to access the hookup services for their stay at the parking facility, the reservation return receipt preferably contains other information, including 1) a 24 hour emergency assistance number to call during any scenario of uncertainty where assistance becomes needed, 2) access to numerous security cameras located throughout the facility, and 3) one or more access codes to communal services available at the parking facility, such as an electric or mechanical locks for an onsite trash bin to dispose of trash or locks to the onsite dog park. The security cameras and emergency assistance number help the staff and guests resolve any scenario where assistance becomes needed and to provide peace of mind for visiting guests when walking about, tending to pets or sleeping in an otherwise new or strange, to them, environment. When necessary, staff has access to and can contact local service providers on behalf of guests, including RV repair facilities and equipment providers, private security businesses and police, and tow truck operators.

The staff and guests also have the option to have private video conferences regarding issues that may arise during their stay and may also conference in a service provider when necessary. It will also be appreciated that the software for the automated reservation system, the automated control system, and the security/issues resolution communications can be integrated into a single software system that has front end functionalities for the guests (i.e., reservation, service, and/or security requests) as well as the backend control functionalities for the staff (management and control of reservations and hookup services, additional service and/or security requests, and guest communications).

When the guest arrives at their designated RV parking facility and pulls into their assigned and rented parking site, the automated control system receives the occupied status information 502 from one or more vehicle sensors that monitor the parking site occupancy status and also checks the reservation information from the reservation program to confirm that the reservation window has begun for the parking site 504. Some guests may arrive a little early so the control system allows for this situation by accepting early arrivals for a reasonable period of time that the parking facilities manager(s) can set in their backend data entry to the control system. A default for an acceptable early arrival can be approximately thirty (30) minutes to a couple of hours or some other number of minutes or hours (time to window start <X hours) depending on the length of the stay and the end time for the previous guest that has reserved the space for the time period before the arriving guest. As will be evident from the logic paths explained below, guests that have longer reservation windows will be afforded extra considerations at the start and end of their reservation windows.

When the reservation window is either already opened, waiting for the guest, or the guest arrives within the early arrival period, the control system communicates with the PLC to send the active status signal for activating the smart switches and smart valves, thereby activating the utility services 506a through the multiservice hookup pedestal as described in detail above. The automated control system preferably uses internet communications and internet protocol (IP) addresses to activate and deactivate smart electric breaker/switches or other electronically controlled relays to activate electric current flow to the correct pedestal for electric power and smart valves for water hydrants that are situated at hookup pedestals in service islands that are adjacent to and preferably elevated from the respective parking sites. As explained in detail above, the activation of the smart switches for electric power also allows the guest to unlock the latch to the inlet cover using the manually actuated switch. The automated control system preferably uses secure communications (closed) with the smart switches and smart valves to automatically turn on the electric power and the water, respectively, at the hookup pedestal in the assigned parking site.

Although the control system preferably immediately activates the utility services when the occupied status is triggered by a vehicle within the reservation window and early arrival period, the control system may also require the arriving party to provide some form of positive identification confirming that they are the guest 508. This can be performed any number of ways, including the entry of information through a keypad, a reader, a touchscreen display, and/or a wireless communication module. With regard to wireless communication, if the guest has already registered their mobile phone with the reservation system or the guest has previously been a guest with the RV parking facility, the proximity feature of the smartphone can communicate wirelessly with the hookup pedestal's wireless access point or wireless sensor to automatically confirm the arrival. If the guest identification positive confirmation process is activated in the control system, if a positive identification fails to be made within a reasonable period of time after the arriving vehicle triggered the activation of the utility services, the parking site's utility services are deactivated and the possible freeloader process begins.

If a vehicle arrives at the parking site before the early arrival period for the next reservation window of fails the positive identification confirmation logic path, the control system will not activate the utility services through the hookup pedestal 506b. The arriving vehicle could still be the guest in which case, the guest can either access the automated reservation system to adjust their reservation window to the earlier arrival time or contact the attendant to request assistance and a possible manual override 540. However, it is also possible that a vehicle arriving at the parking site which does not have an open reservation window could be a traveler who is trying to use the parking space without reserving the space or paying for the utility services available at the parking site (i.e., freeloaders). It is also possible that the vehicle is for a guest who has reserved another parking site and accidentally pulled into the wrong parking site. The control system has a delay that waits for a short period of time, such as several minutes (M) that can be set in the backend data entry to the control system 510, and if the vehicle remains in the parking site, the control system automatically provides a warning to the potential freeloader 512. As described above for the hookup pedestal, the warning could be a flashing light and/or an audible notice. If there is a screen on the hookup pedestal, the control system could also provide instructions or messages that warn of the consequences for unauthorized parking. If the vehicle remains in the parking site for another period of time (N) 514 that may also be set in the backend data entry to the control system, a local towing company may be called to move the vehicle 516.

As described above, the backend of the control system's software integrates with the PLCs that control the smart switches and smart valves in the respective hookup pedestals. The front end of the software program allows guests to reserve sites and pay for their stay via an app on their smartphone or tablet computer or through a web-based software program on either of these electronic devices or through a laptop or other computer. It is also possible to provide a kiosk for guests to reserve any available parking site upon arrival. The sensors in the parking sites provide data to the automated control system to indicate arrivals that check in, vacancies on departure, potential overstays, and attempted freeloaders. Each scenario can be dealt with automatically in the computer program with the control of the hookup pedestals. For example, as shown in FIG. 5A, when reserving parking sites, guests enter their vehicle license number and the onsite sensors and cameras can serve as license plate readers so the system can automatically identify the guests' vehicles who have reserved their parking sites. The system preferably keeps a file of license plates for guests' vehicles to help the staff that is monitoring multiple facilities.

When it comes time for the departure of the vehicle and/or the end of the reservation window, the control system's software follows additional logic paths to deactivate the hookup pedestals in the parking sites when they are no longer being used. The software, either in the control software or the reservation software, can add any substantial time period before the start of the next scheduled reservation window back to the automated reservation system as time that is available for one or more intervening reservations. Accordingly, the automated control system also communicates with the reservation system when the vehicle sensors provide the vacant status information. When a vacancy has been detected using the vehicle sensors, the control system may also check the line-load sensor information to determine whether there remains an amperage draw through the electrical control panel 520. For some hitched trailers, it is possible to detach the trailer from the truck for an excursion or to get provisions at a store, and although the location of the trailer may not register with the vehicle sensors due to its location in the parking site relative to the sensors, the amperage draw would be indicative of the trailer being in the parking site. Accordingly, the line-load sensors can be a redundancy to the vehicle sensors and may also be checked periodically relative to the vehicle sensors to evaluate the reliability of the vehicle sensors.

When the sensors indicate that the parking site is vacant, the control system checks the reservation information for the parking site to determine whether the reservation is toward the end of the window 518. Just as some guests may arrive before the reservation window, it is also possible that guests could depart hours before the reservation window is at its end, and in some cases, the early departure could be one or more days early. For reservations that have a multiday window, when the reservation is in the final half day (Y hours), such as within the final ten (10), if there is a vacancy and no electricity is being used, the control system will determine that the parking site is vacant 522 and deactivate the utility services provided through the hookup pedestal 524a. For a reservation window that is less than one (1) day, an early departure determination could be made for departure that is less than the end departure period assigned to a multiday reservation window (time to window end <Y hours). For example, if the control system determines that there is a vacancy within the last six (6) hours of the smaller reservation window, the control system will determine that the parking site is vacant and 524b deactivate the utility services provided through the hookup pedestal. As with the other periods of time that are used and evaluated in the reservation and control systems, the times can be changed in the backend data entry, such as in a management dashboard for the reservation and/or control systems.

With the deactivation of the utility services for the parking site, the control system and/or reservation system can evaluate the time remaining before the start of the start of the window for the next scheduled reservation relative to a minimum reservation time period (Z hours) to determine whether there is sufficient time to schedule one or more intervening reservations. For example, if the minimum reservation time period is twelve (12) hours, and the last guest has departed early, if the next start of a reservation window greater than twelve (12) hours from the early termination of the last reservation window, there is sufficient time to provide a vacancy for the open time where there is no scheduled reservation. Preferably, the rental agreement includes a notice that if the site is left vacant for more than a certain period of time, the parking site can be considered open for another reservation.

Another logic path can be used for any holdover guests who have remained in their parking site past the end of their corresponding reservation windows. To help avoid this situation, when a guest's vehicle remains in the parking site towards the end of the reservation window (time to window end <W hours) 526, the control system and/or reservation system can automatically send the guest a reminder that the reservation window will end within the specified time period and that the utility services will be deactivated at that time 528. In the situation where the start of the next reservation for the parking site is greater than a specified time, such as the minimum reservation window (Z hours) 530, the guest can be offered the option to extend their reservation window 532a by some time that would be greater than the minimum reservation window and would be less than the time to start of the next reservation (Q time). If the guest pays for an extension to the reservation the end of the reservation window is adjusted accordingly 532b.

For any guest that is a holdover and remains in the parking site when the reservation window comes to its end 534, the control system deactivates the utility services provided through the hookup pedestal 536 and follows the same general process described above for a freeloader. The difference with the freeloader and the holdover guest is the reservation system has the contact information for the holdover guest; accordingly, at the same time that the utility services are deactivated, the attendant responsible for the RV parking facility with the holdover guest is provided with the holdover guest's contact information for a wellbeing check and resolve the holdover issue before the next guest arrives at the parking site 538. Of course, if there are other parking sites which are available (open but inactive) and the next guest for the parking site arrives before the holdover issue is resolved, the attendant can manually override the automated control system and activate the available open parking site for the next guest until the holdover issue is resolved. For any problem guests who have violated the terms of service for the parking facility and/or may be bothering other guests at the parking facility or otherwise creating a nuisance, a similar process can be used with a manual override to deactivate the utility services at the parking site and flash the warning light at the parking site.

The present invention solves a need for automated control of RV parking facilities that can be located in or very near major cities close to the interstate highways. The lack of such facilities makes it a challenge for transient RV travelers who want short-term parking sites along waypoints between longer-term destinations or who want to stay close to or within a city for attractions, business, or to be close to a loved one in a hospital. Most traditional campgrounds are almost always a significant distance from an interstate highway and larger cities because they mainly exist as destinations for those who camp at a campground or park there to visit other nearby natural recreational sites. Traditional campgrounds generally contain extra recreational aspects, such as swimming pools, shower houses, playgrounds, rivers, lakes, convenience stores and so on, which are not typically used by the transient RV travelers looking for a short-term stay between destinations or for a stay in or near a large city. The cost of land in and near large cities is at a premium, and these extra amenities result in additional costs for the land. Additionally, traditional campground with extra amenities requires a staff of people onsite to tend to all of the services and functions involved. Accordingly, by maximizing the use of the lot for RV parking and hookup services, minimizing the use of the lot for communal services, and automating the control of the utility services at the parking sites, thereby eliminating the need for onsite staff (i.e., remote control and automated systems), the present invention provides an option that had not been previously available because the lack of technology systems according to the present invention made such RV parking facilities financially untenable.

The automated systems and remote control features of the present invention significantly reduces labor costs and other costly services and functions from the base cost for parking with hookup services. The labor and cost savings allows RV parking facilities that use the present invention to operate in real estate locations of higher value that are closer to or within larger cities with higher traffic adjacent to major interstate highways where man-made attractions, restaurants, fueling stations, shopping and entertainment exists while being economically competitively priced when compared to a traditional campground parking site. Automation also allows for shorter term rentals, such as a twelve (12) hour rental period for transient travelers that want a safe place to sleep while parked in a parking site with full utility services in the hookup, rather than the traditional full day rental requirement.

The automated and remote control of the utility services provided through the hookup pedestals is also beneficial for using existing parking facilities of retail stores and service provides to the RV community who have enough space in their parking lots to add the multiservice hookup pedestals for the utility services. The innovative automated and remote control features of the present invention are also beneficial to retail stores and the service providers who may want to provide hookup pedestals with only electric utility service.

Accordingly, for these nontraditional RV parking facilities that take advantage of the automation provided by the present invention, the vehicle sensors are extremely important. Rather than using a distributed set of sensors at each one of the parking sites, nontraditional RV parking facilities and even some RV parking facilities, including those that may be retrofitted, may want to use a centralized sensor array, such as machine vision that can positively identify when a parking site is vacant and when a parking site is occupied.

The automated functions of the present invention services can be modified to suit a particular need or desire. For example, as indicated above some parking facilities may want to positively identify guests when they arrive. In some cases, prior to activating the parking site, the system may automatically send a text message or email or may place an automated phone call or use other communication means with the expected guest to request a positive affirmation which confirms the expected guest is in vehicle that has arrived at the parking site. In addition to the positive identification examples described above, the automated systems of the present invention can provide the guest with a confirmation number upon the arrival of a vehicle, and if the vehicle belongs to the guest, they can enter the confirmation number through any of the means described above. As explained above, it is possible that an arrival may be an expected guest who has entered the wrong parking site and needs to be guided to the correct parking site. Additionally, it is possible that a guest at one parking site may be temporarily using another parking site for a secondary vehicle. Of course, it is also possible that the vehicle belongs to an attempted freeloader so the local towing company may be called.

In the potential freeloader situation discussed above, the system may notify an offsite attendant and automatically pull up the camera video feed for the parking facility that shows the parking site in question and may also guide the attendant in taking the appropriate action to have the vehicle moved to the correct parking site or removed entirely from the parking facility. Sometimes, a nearby guest might occupy part of another parking site in which case they will be contacted and dealt with appropriately. If it is an attempted freeloader, the local tow company can be called and possibly the local police depending on what is found when viewing the video record. Whatever the case may be, it all happens because of the vehicle sensors in the parking facility.

The automated system of the present invention enables guests to come to a parking facility without having to personally interact with anyone. Guests can reserve their parking sites, pay for the parking sites, enter into a user agreement, and receive their receipts and instructions for the entire transaction electronically. Guests can proceed directly to their assigned parking sites where power, water and sewer access are all made available to the guest automatically with a remote control system that operates in conjunction with local sensors and video cameras that monitor the parking facility and smart switches and smart valves. The hookup services continue to be provided to each guest for the time period of their reservation. Preferably, guests are allowed into the parking facility without encountering a gate or any barrier of any kind which allows for local delivery of food and other service providers or unhindered visits and appointments with local friends, family or business matters. Once onsite, the utilities become available automatically, and when the guest leaves there is no checkout required or obstacle to leaving at will. Guests can also purchase blocks of time to use at will in any park that they choose and that have a vacancy. The guests can come and go from the parking facilities on demand and would only pay for the time that they use. When buying blocks of time, the guests may be allowed a lower minimum time period for a stay. For example, if the standard minimum stay is twelve (12) hours, guests that pay for blocks of time may only be required to pay for two (2) hours. This might allow a guest to stop in a city and have a meal at a restaurant or to allow the driver and a passenger to cook a meal together while parked rather than having the passenger cook while the driver continues driving.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although the preferred embodiment does not include a microphone or speaker in the hookup pedestal, such as described in US Pat. App. Pub. No. 2003/0004792, because the remote attendant would typically be speaking with the guests through their mobile phones, the microphone and speaker may be helpful in some sites so that the remote attendant can help guests who have not made a reservation online and can also warn trespassers to leave or their vehicle will be towed. Additionally, it will also be appreciated that aspects of the present invention could be used for other guests who reserve parking sites for their vehicles that require hookup services, such as boats at marinas and electric vehicles at hotels, restaurants, hospitals, sporting arenas, attractions, entertainment places, city, state or national parks, and all other waypoints. As a particular example of electric vehicles, the integrated automated reservation and control system combined with the hookup pedestal for electrical service (not even including the potable water service or sewer service) is an innovative improvement over the self-service point of purchase operations that are currently required. Thus, the breadth and scope of the present invention should not be limited by any of the above-described exemplary embodiments, but should be defined only in accordance with the following claims appended hereto and their equivalents.

There are numerous recreational vehicle parking facilities that could benefit from the advances of the present invention, including some facilities that are located in or near cities, facilities that are located along highways, facilities that are located around military bases, and even retrofitting and improving campground facilities such as Kampgrounds of America® (KOA) sites that may be in remote locations. It will be appreciated that the RV Self-Park® business model could be beneficially used by attractions, national parks, theme parks, resorts, stadiums, hospitals, RV service providers, and even retail stores that have large parking lots that are not always full and can change a portion of the lot for RV parking with the hookup pedestals and remote control and automated systems of the present invention.

What is claimed is:

1. A multiservice hookup pedestal for connection to an electric line transmissively connected to an electric power grid and to at least one of a dump station inlet fluidly connected to a sewer pipe and a plumbing fixture fluidly connected to a potable water main and in operative communication with a programmable logic controller providing an active status signal, the multiservice hookup pedestal comprising:
  a base;
  a housing connected to the base;
  a mounting bracket connected to at least one of the base and the housing;
  an electric outlet panel contained in the housing, wherein the electric outlet panel comprises at least one electrical outlet;
  an inlet cover connected to the mounting bracket and moving between a closed position and an opened position, wherein the inlet cover blocks the dump station inlet in the closed position, and wherein the inlet cover is spaced a distance from the dump station inlet in the opened position;
  a latch having a locked configuration and an unlocked configuration, wherein the locked configuration of the latch prevents the inlet cover from moving from the closed position to the opened position, and wherein the unlocked configuration of the latch allows the inlet cover to move from the closed position to the opened position; and
  a first electric power circuit operatively connected to the electrical power line, wherein the first electric power circuit is comprised of a first smart switch, the electric outlet panel, a latch actuator, and a manually actuated switch, wherein the first smart switch is in operative communication with the programmable logic controller and is situated in series between the electrical power line and at least one of the electric outlet and the manually actuated switch, wherein the first smart switch has a closed state when the programmable logic controller provides the active status signal, wherein the first smart switch in the closed state provides a first electric transmission from the electric line to the electric outlet panel and the manually actuated switch, wherein the first smart switch has an open state preventing the first electric transmission from the electric line to the electric outlet panel and the manually actuated switch, wherein the manually actuated switch is situated in series between the first smart switch and the latch actuator, wherein the manually actuated switch has an on-position closing the first electric power circuit and providing the first electric transmission to the latch actuator when the first smart switch is in the closed state, wherein the manually actuated switch has an off-position opening the first electric power circuit and preventing the first electric transmission to the latch actuator when the first smart switch is in the closed state, wherein the latch actuator is connected to the latch, wherein the latch actuator is put into a powered condition by the first electric transmission, and wherein the powered condition of the latch actuator forces the latch to move between the locked configuration and the unlocked configuration.

2. The multiservice hookup pedestal of claim 1, wherein the first smart switch is comprised of a first biased-open relay, wherein the first biased-open relay remains in the open state when the programmable logic controller does not provide the active status signal, and wherein the active status signal is an electrical relay signal.

3. The multiservice hookup pedestal of claim 1, wherein the mounting bracket is further comprised of at least one of a track and a hinge, wherein the inlet cover is comprised of at least one of a post slidingly connected to the track by a runner and a door swingingly connected to the housing by the hinge, wherein the manually actuated switch is biased to an off-position, and wherein the inlet cover is held in the closed position by the latch in the locked configuration.

4. The multiservice hookup pedestal of claim 3, wherein the inlet cover is further comprised of a handle connected to an exterior side of the post and a plug held within an interior space in a bottom section of the post, wherein the plug is situated in the dump station inlet when the post is lowered into the closed position, wherein the plug is spaced from the dump station inlet when the post is raised into the opened position, wherein the mounting bracket is further comprised of a panel connected to the base, wherein the panel is further comprised of an open slot to an interior space of the panel, wherein the latch and the latch actuator are fastened to the panel within the interior space, wherein the post is further comprised of a bar extending from an outer surface of the post through the slot into the interior space of the panel, wherein the outer surface of the post faces inward towards the slot in the panel, wherein the bar is held below the latch when the post is lowered to the closed position with the latch in the locked configuration, and wherein the bar is permitted to slide above the latch when the latch is in the unlocked configuration allowing the post to be raised into the opened position.

5. The multiservice hookup pedestal of claim 1, wherein the manually actuated switch is biased to the off-position.

6. The multiservice hookup pedestal of claim 5, further comprising an electric service selector operatively connected to the electric outlet panel, wherein the electric service selector is comprised of a rotary changeover switch with a plurality of knob positions, wherein the electric outlet panel is further comprised of a plurality of electrical outlets and a circuit breaker, wherein a first set of electrical outlets correspond with one of the knob position, and wherein a second set of electrical outlets correspond with another one of the knob position, wherein the manually actuated switch is comprised of a spring-loaded pushbutton switch.

7. The multiservice hookup pedestal of claim 1, further comprising a second smart switch, a water line, an electrically actuated valve, and a manually actuated valve, wherein the second smart switch is in operative communication with the programmable logic controller, wherein the second smart switch is situated in series between the electrical power line and the electrically actuated valve in a second electric power circuit operatively connected to the electrical power line, wherein the electrically actuated valve is connected to and in fluid communication with the plumbing fixture, wherein the water line fluidly connects the electrically actuated valve to the manually actuated valve, wherein the second smart switch powers the electrically actuated valve to an open flow state when the programmable logic controller provides the active status signal, and wherein the manually actuated valve has a range of flow rates between a no-flow rate and a full-flow rate, inclusive, when the electrically actuated valve is in the open flow state.

8. The multiservice hookup pedestal of claim 7, wherein the second smart switch powers the electrically actuated valve to a closed flow state when the programmable logic controller either provides an inactive status signal or does not provide the active status signal.

9. The multiservice hookup pedestal of claim 1, further comprising a vehicle sensor for a parking space serviced by the multiservice hookup pedestal and a micro-processor in operative communication with the programmable logic controller and connected to at least one of the base, the housing, and the bracket, wherein the vehicle sensor and the micro-processor are electrically connected to the electrical power line in an always powered electric circuit and without regard to the active status signal provided by the programmable logic controller, wherein the vehicle sensor determines a parking site occupancy status for the parking space, wherein the parking site occupancy status is either a vacant status or an occupied status, and wherein the vehicle sensor communicates the parking site occupancy status to the programmable logic controller.

10. The multiservice hookup pedestal of claim 9, further comprising a parking site status sign attached to the housing and a plurality of vehicle sensors for the parking space serviced by the multiservice hookup pedestal, wherein at least one of the vehicle sensors is a line-load sensor, wherein another one of the sensors is selected from the group of sensors comprising a pair of through-beam sensors, an in-ground sensor, a machine vision sensor, and an infrared reflective sensor, wherein at least one of the micro-processor and the programmable logic controller determines an unauthorized vehicle condition for the parking space when the parking site occupancy status is the occupied status and the programmable logic controller has not provided the active status signal, and wherein the micro-processor causes the parking site status sign to provide at least one of a visual indication and an audible indication of the unauthorized vehicle condition.

11. The multiservice hookup pedestal of claim 9, wherein the housing further comprises a user interface device selected from the group of devices consisting of a keypad entry, a credit card reader, a touchscreen display, a wireless communication module, and any combination thereof, wherein the user interface device is in operative communication with the programmable logic controller and is electrically connected to the electrical power line in the always powered electric circuit and without regard to the active status signal provided by the programmable logic controller, wherein a positive user identification is input into the user interface device and is communicated to the programmable logic controller.

12. A multiservice hookup pedestal for connection to an electric line transmissively connected to an electric power grid and to at least one of a dump station inlet fluidly connected to a sewer pipe and a plumbing fixture fluidly connected to a potable water main and in operative communication with a programmable logic controller providing an active status signal, the multiservice hookup pedestal comprising:
  a base;
  a housing connected to the base;
  a mounting bracket connected to at least one of the base and the housing;
  an electric outlet panel contained in the housing, wherein the electric outlet panel comprises at least one electrical outlet;
  a first electric power circuit operatively connected to the electrical power line, wherein the first electric power circuit is comprised of a first smart switch and the electric outlet panel, wherein the first smart switch is in operative communication with the programmable logic controller and is situated in series between the electrical power line and the electric outlet, wherein the first smart switch has a closed state when the programmable logic controller provides the active status signal, wherein the first smart switch in the closed state provides a first electric transmission from the electric line to the electric outlet panel, and wherein the first smart switch has an open state preventing the first electric transmission from the electric line to the electric outlet panel;
  a potable water control system comprising a water line, an electrically actuated valve, and a manually actuated valve, wherein the electrically actuated valve is connected to and in fluid communication with the plumbing fixture, and wherein the water line fluidly connects the electrically actuated valve to the manually actuated valve; and
  a second electric power circuit operatively connected to the electrical power line, wherein the second electric power circuit is comprised of a second smart switch and the electrically actuated valve, wherein the second smart switch is in operative communication with the programmable logic controller, wherein the second smart switch is situated in series between the electrical power line and the electrically actuated valve, wherein the second smart switch powers the electrically actuated valve to an open flow state when the programmable logic controller provides the active status signal, and wherein the manually actuated valve has a range of flow rates between a no-flow rate and a full-flow rate, inclusive, when the electrically actuated valve is in the open flow state.

13. The multiservice hookup pedestal of claim 12, wherein the second smart switch powers the electrically actuated valve to a closed flow state when the programmable logic controller either provides an inactive status signal or does not provide the active status signal.

14. The multiservice hookup pedestal of claim 12, further comprising:
  an inlet cover connected to the mounting bracket and moving between a closed position and an opened position, wherein the inlet cover blocks the dump station inlet in the closed position, and wherein the inlet cover is spaced a distance from the dump station inlet in the opened position; and
  a latch having a locked configuration and an unlocked configuration, wherein the locked configuration of the latch prevents the inlet cover from moving from the closed position to the opened position, and wherein the unlocked configuration of the latch allows the inlet cover to move from the closed position to the opened position.

15. The multiservice hookup pedestal of claim 14, wherein the first electric power circuit further comprises a manually actuated switch and a latch actuator, wherein the manually actuated switch is situated in series between the first smart switch and the latch actuator, wherein the manually actuated switch has an on-position closing the first electric power circuit and providing the first electric transmission to the latch actuator when the first smart switch is in the closed state, wherein the manually actuated switch has an off-position opening the first electric power circuit and preventing the first electric transmission to the latch actuator when the first smart switch is in the closed state, wherein the latch actuator is connected to the latch, wherein the latch actuator is put into a powered condition by the first electric transmission, and wherein the powered condition of the latch actuator forces the latch to move between the locked configuration and the unlocked configuration.

16. The multiservice hookup pedestal of claim 12, further comprising a vehicle sensor and a micro-processor in operative communication with the programmable logic controller and connected to at least one of the base, the housing, and the bracket, wherein the vehicle sensor and the micro-processor are electrically connected to the electrical power line in an always powered electric circuit and without regard to the active status signal provided by the programmable logic controller, wherein the vehicle sensor determines a parking site occupancy status, wherein the parking site occupancy status is either a vacant status or an occupied status, and wherein the vehicle sensor communicates the parking site occupancy status to the programmable logic controller.

17. A multiservice hookup pedestal for connection to an electric line transmissively connected to an electric power grid and to at least one of a dump station inlet fluidly connected to a sewer pipe and a plumbing fixture fluidly connected to a potable water main and in operative communication with a programmable logic controller providing an active status signal, the multiservice hookup pedestal comprising:
- a base;
- a housing connected to the base;
- a mounting bracket connected to at least one of the base and the housing;
- an electric outlet panel contained in the housing, wherein the electric outlet panel comprises at least one electrical outlet;
- a first electric power circuit operatively connected to the electrical power line, wherein the first electric power circuit is comprised of a first smart switch and the electric outlet panel, wherein the first smart switch is in operative communication with the programmable logic controller and is situated in series between the electrical power line and the electric outlet, wherein the first smart switch has a closed state when the programmable logic controller provides the active status signal, wherein the first smart switch in the closed state provides a first electric transmission from the electric line to the electric outlet panel, and wherein the first smart switch has an open state preventing the first electric transmission from the electric line to the electric outlet panel; and
- a vehicle sensor and a micro-processor in operative communication with the programmable logic controller and connected to at least one of the base, the housing, and the bracket for a parking space serviced by the multiservice hookup pedestal, wherein the vehicle sensor and the micro-processor are electrically connected to the electrical power line in an always powered electric circuit and without regard to the active status signal provided by the programmable logic controller, wherein the vehicle sensor determines a parking site occupancy status for the parking space, wherein the parking site occupancy status is either a vacant status or an occupied status, and wherein the vehicle sensor communicates the parking site occupancy status to the programmable logic controller.

18. The multiservice hookup pedestal of claim 17, further comprising a plurality of vehicle sensors for the parking space serviced by the multiservice hookup pedestal, wherein at least one of the vehicle sensors is a line-load sensor, and wherein another one of the sensors is selected from the group of sensors comprising a pair of through-beam sensors, an in-ground sensor, a machine vision sensor, and an infrared reflective sensor.

19. The multiservice hookup pedestal of claim 17, further comprising:
- an inlet cover connected to the mounting bracket and moving between a closed position and an opened position, wherein the inlet cover blocks the dump station inlet in the closed position, and wherein the inlet cover is spaced a distance from the dump station inlet in the opened position; and
- a latch having a locked configuration and an unlocked configuration, wherein the locked configuration of the latch prevents the inlet cover from moving from the closed position to the opened position, and wherein the unlocked configuration of the latch allows the inlet cover to move from the closed position to the opened position;
- wherein the first electric power circuit further comprises a manually actuated switch and a latch actuator, wherein the manually actuated switch is situated in series between the first smart switch and the latch actuator, wherein the manually actuated switch has an on-position closing the first electric power circuit and providing the first electric transmission to the latch actuator when the first smart switch is in the closed state, wherein the manually actuated switch has an off-position opening the first electric power circuit and preventing the first electric transmission to the latch actuator when the first smart switch is in the closed state, wherein the latch actuator is connected to the latch, wherein the latch actuator is put into a powered condition by the first electric transmission, and wherein the powered condition of the latch actuator forces the latch to move between the locked configuration and the unlocked configuration.

20. The multiservice hookup pedestal of claim 17, further comprising:
- a parking site status sign attached to the housing, wherein at least one of the micro-processor and the programmable logic controller determines an unauthorized vehicle condition when the parking site occupancy status is the occupied status and the programmable logic controller has not provided the active status signal, and wherein the micro-processor causes the parking site status sign to provide at least one of a visual indication and an audible indication of the unauthorized vehicle condition;
- a potable water control system comprising a water line, an electrically actuated valve, and a manually actuated valve, wherein the electrically actuated valve is connected to and in fluid communication with the plumbing fixture, and wherein the water line fluidly connects the electrically actuated valve to the manually actuated valve; and
- a second electric power circuit operatively connected to the electrical power line, wherein the second electric power circuit is comprised of a second smart switch and the electrically actuated valve, wherein the second smart switch is in operative communication with the programmable logic controller, wherein the second smart switch is situated in series between the electrical power line and the electrically actuated valve, wherein the second smart switch powers the electrically actuated valve to an open flow state when the programmable logic controller provides the active status signal, and wherein the manually actuated valve has a range of flow rates between a no-flow rate and a full-flow rate, inclusive, when the electrically actuated valve is in the open flow state.

* * * * *